United States Patent
Ishiyama et al.

(10) Patent No.: US 6,766,268 B2
(45) Date of Patent: Jul. 20, 2004

(54) METHOD FOR CALCULATING HEATING PROCEDURE OF LINEAR HEATING

(75) Inventors: Morinobu Ishiyama, Hiroshima (JP); Jun Kobayashi, Hiroshima (JP)

(73) Assignee: IHI Marine United Inc., Tokyo (JP)

( * ) Notice: Subject to any disclaimer, the term of this patent is extended or adjusted under 35 U.S.C. 154(b) by 78 days.

(21) Appl. No.: 10/291,768

(22) Filed: Nov. 12, 2002

(65) Prior Publication Data

US 2003/0097199 A1 May 22, 2003

(30) Foreign Application Priority Data

Nov. 16, 2001 (JP) ........................................ 2001-352076
Feb. 15, 2002 (JP) ........................................ 2002-038329

(51) Int. Cl.$^7$ .............................................. G06F 19/00
(52) U.S. Cl. ........................ 702/136; 702/42; 702/99; 700/207; 700/165
(58) Field of Search ........................... 702/33, 42, 99, 702/136; 700/165, 207; 264/532, 535, 537; 73/159, 160

(56) References Cited

U.S. PATENT DOCUMENTS

| 4,807,801 A | * | 2/1989 | Nakamura .................. 148/520 |
| 5,203,206 A | * | 4/1993 | Shofner et al. ............... 73/160 |
| 5,923,415 A | * | 7/1999 | Sakata et al. .............. 356/73.1 |

FOREIGN PATENT DOCUMENTS

| JP | 10-146620 | 6/1998 |
| JP | 10-230326 | 9/1998 |
| JP | 2001-071041 | 3/2001 |

* cited by examiner

*Primary Examiner*—Bryan Bui
(74) *Attorney, Agent, or Firm*—Oblon, Spivak, McClelland, Maier & Neustadt, P.C.

(57) ABSTRACT

A distribution of bending principal strains giving a target shape of a curved surface is obtained (Step S1), and a calculation grid is divided along the direction of the bending principal strains (Step S2). A database storing actual measurement values of relations between heating conditions and deformation amounts is prepared (Step S3). The directions of the bending principal strains are divided into the directions of the maximum and minimum bending principal strains (Step S4) for each calculation grid. Then, a heating condition for obtaining a bending strain satisfying the maximum bending principal strain is obtained by a heating line perpendicular to the direction of the maximum bending principal strain, and a membrane strain generated accompanying with heating in this case is obtained by referring to the database (Step S5). Membrane strains generating a deflection of the target shape of a curved surface are calculated in consideration of the distribution of the membrane strains obtained in Step S5, and a heating condition satisfying the membrane strains in the two principal axis directions is obtained (Step S6). Then, a heating procedure is determined (Step S7).

8 Claims, 9 Drawing Sheets

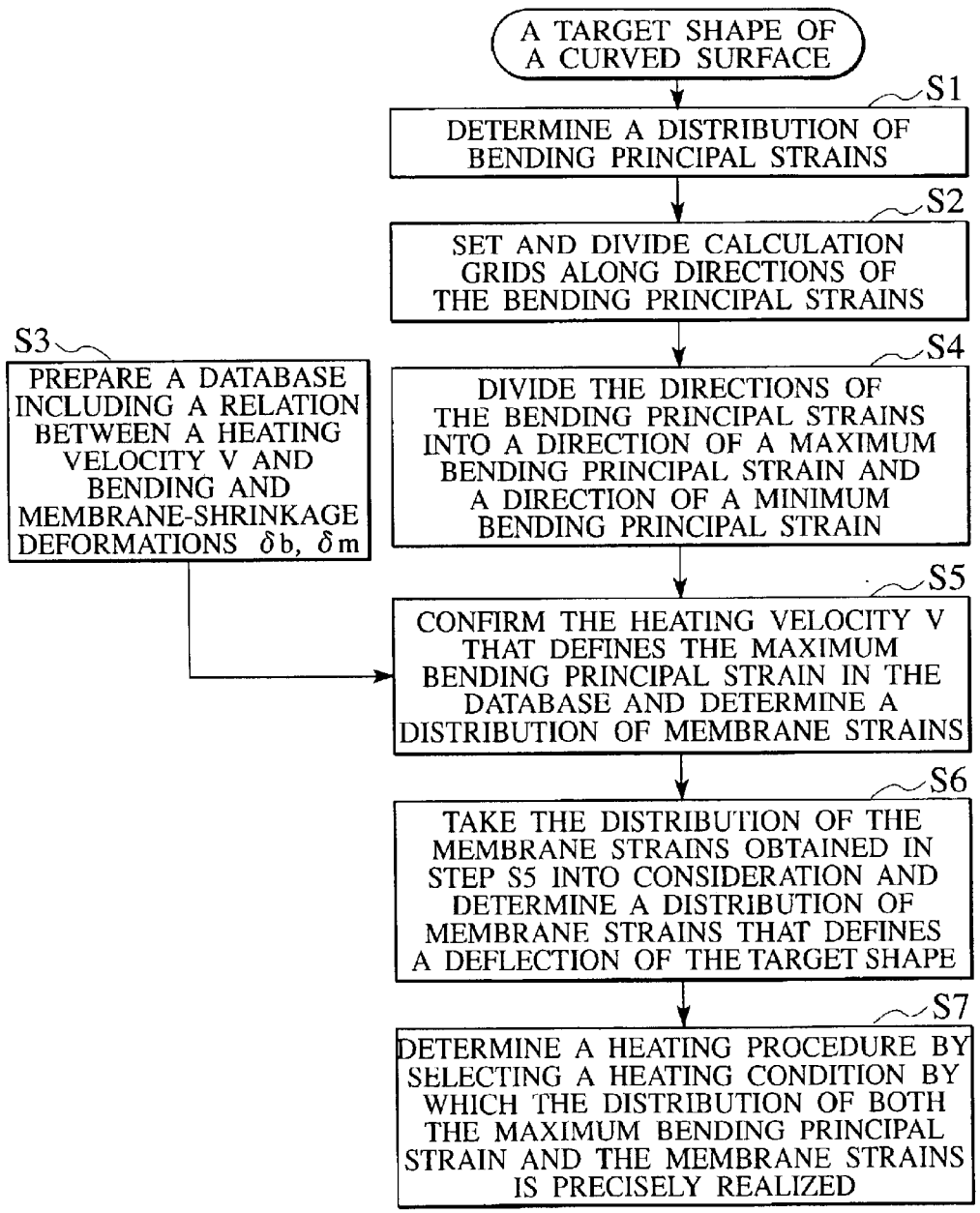

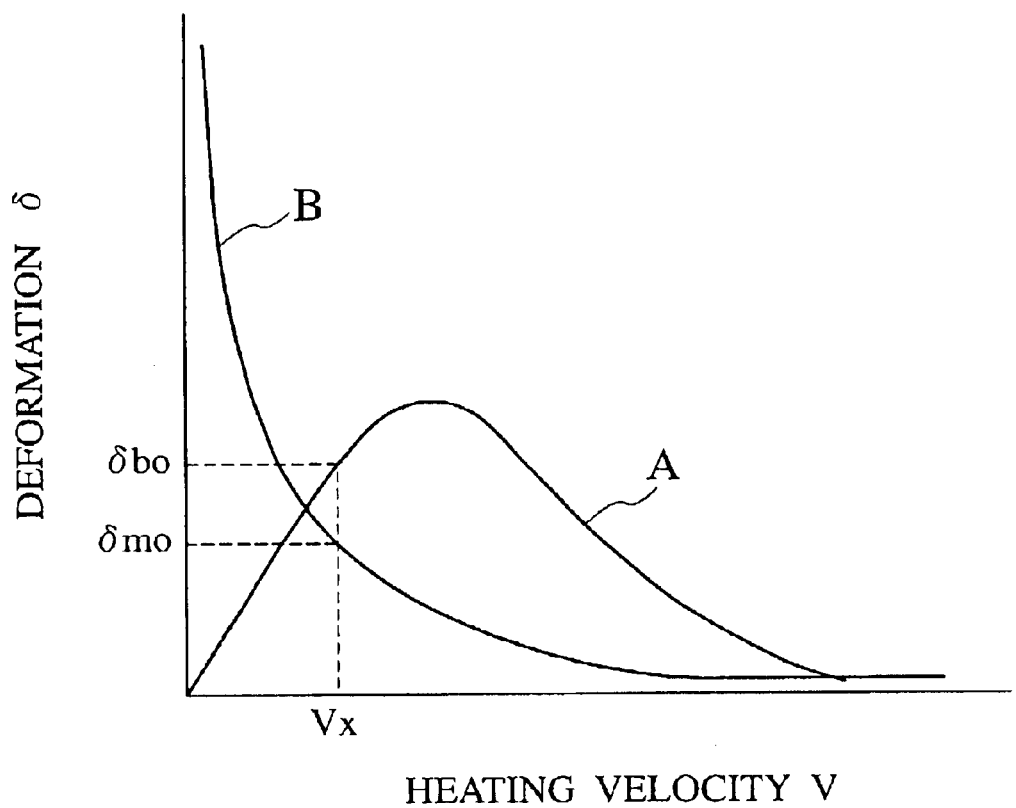

METHOD FOR CALCULATING HEATING PROCEDURE OF LINEAR HEATING

BACKGROUND OF THE INVENTION

1. Field of the Invention

The present invention relates to a method for calculating a heating procedure of a linear heating, in which an arrangement and heating conditions for heating lines are determined in order to carry out bending work such as work for a plate into an outer bending plate constituting a vessel shell (work for a metal plate into a target shape of a curved surface) in shipbuilding.

2. Description of the Related Art

In recent years, a method of bending work by a linear heating has been adopted for the bending work for a metal plate for use in a vessel or the like.

The linear heating is a technology of utilizing a property of a metal plate, in which the metal plate generates a plastic strain and deforms itself upon being restricted from a periphery thereof when the metal plate is linearly heated by a point heat source such as a gas burner. In addition, the linear heating is a technology of carrying out bending work for a metal plate as an object into a target shape of a curved surface by arranging heating points on respective spots on a metal plate.

Conventionally, it has been conceived that the bending work for a metal plate by the linear heating is a technique to be acquired through a long-term experience. Heating positions, directions, conditions and the like have been determined by senses and skills of skilled workers, and the bending work has been carried out. However, such a conventional method depending on the work of the skilled workers has involved problems that a long time is required for acquiring the skill and of a lack of successors. Further, a problem of a large variation in working precision has occurred. Therefore, in recent years, a method for mechanically carrying out the linear heating has been proposed.

As this type of method for mechanically carrying out the linear heating, there is a method to be described below. Namely, the surface of a metal plate to be subjected to the bending work is divided into a large number of regions by applying the Finite Element Method (FEM). Moreover, a target specific strain required for executing the bending work into the target shape of a curved surface is obtained for each of the divided regions. Curved heating lines are arranged in a crossing manner on the divided regions of one surface of the metal plate, and the metal plate is locally heated so as to receive a specified supplied heat with a moving velocity of a heat source as a control parameter while moving the heat source along the heating lines. In this manner, the membrane-shrinkage and bending strain components of the target specific strain are given, thereby bending each of the divided regions to the target shape and bending the entire metal plate to a target curved surface.

Note that a plurality of strains (i.e., four strain components including membrane-shrinkage strains along the neutral surface of the plate in two principal axes perpendicular to each other, and bending strains operating to the external direction of the plate surface in the two principal axes perpendicular to each other) are concerned in the bending work for the metal plate by the linear heating.

Meanwhile, strains generated by one heating line includes four components: a membrane-shrinkage strain in the perpendicular direction of the heating line; a membrane-shrinkage strain in the tangential direction of the heating line; a bending strain in the perpendicular direction of the heating line; and a bending strain in the tangential direction of the heating line. These four strain components are determined simultaneously for one heating condition. Therefore, in the case of using a method for heating a plate from one surface thereof by controlling only one control parameter in the above-described moving velocity of the heat source and the like, the four strain components to be obtained cannot be satisfied entirely even if two heating lines are arranged in combination perpendicularly to each other.

Therefore, a method for obtaining a heating procedure has been adopted heretofore, which is realized by: (a) a method for arranging heating lines, disclosed in Japanese Patent Application Laid-Open No. H10-230326; (b) a method for obtaining a membrane strain, disclosed in Japanese Patent Application Laid-Open No. 2001-071041; (c) a method for obtaining a heating condition, in which deformations of a plurality of adjacent heating lines are added together, and four strain components to be obtained from a deformation amount obtained by the addition are obtained averagely and approximately by use of an optimization method and so on; or the like. The above-described Japanese Patent Application Laid-Open No. H10-230326 discloses the method for arranging heating lines by paying attention only to one deformation component affecting the formation of a curved surface most, such as a bending or membrane-shrinkage deformation perpendicular to the heating line, among the four deformation components generated by the heating lines (i.e., bending and membrane-shrinkage deformations in the perpendicular direction of the heating line and bending and membrane-shrinkage deformations in the tangential direction thereof). The above-described Japanese Patent Application Laid-Open No. 2001-071041 discloses the following method including the steps of: dividing a target shape of a curved surface into fine grid regions; assuming a membrane strain in each grid region; obtaining a second-order finite difference approximating second-order differential of membrane strains between a membrane strain in the grid region and a membrane strain in a region surrounding the grid region; forming simultaneous equations on the assumption that the second-order finite difference in the membrane strains and a degree of incompatibility R in a region composed of both the grid region and the region surrounding the same are equal to each other; and determining the membrane strain based on these simultaneous equations. The degree of incompatibility R has already been determined at a point of time when the curved surface was given. The degree of incompatibility R is a value obtained from a distribution of the bending strains or a curvature of the curved surface.

However, the method for arranging a heating line by paying attention only to one component affecting the formation of a curved surface most among four deformation components generated by the heating line has the following problem. Namely, the three remaining deformation components operate as disturbances, whereby a difference between the formed surface and the target shape increases. Accordingly, a case may possibly occur, where a heating condition for approximating the strain distribution giving the target shape of a curved surface precisely is not obtained.

Further, the method for obtaining a heating condition, in which the deformations of the plurality of adjacent heating lines are added together, and four strain components to be determined from the deformation amount given by the addition of the deformations are obtained averagely and approximately by use of an optimization method or the like, has the following problem. That is, magnitudes of deformations given by individual heating lines adjacent to each other are significantly different from each other. Therefore, an extra residual stress is induced around the heating lines, thereby deteriorating local precision of the curved surface.

Moreover, there has been the following problem in the method including the steps of: dividing a target shape of a curved surface into fine grid regions; assuming a membrane strain in each grid region; obtaining a second-order finite difference approximating second-order differentials of membrane strains between a membrane strain in the grid region and a membrane strain in a region surrounding the grid region; forming simultaneous equations on the assumption that the second-order finite difference in the membrane strains and a degree of incompatibility R in a region composed of both the grid region and the region surrounding the same are equal to each other; and obtaining the membrane strain based on these simultaneous equations. The problem is as follows: even if the above-described grid region is arranged along the directions of the two principal axes such that a shearing strain component is not interposed in these simultaneous equations, two independent components that are the bending and membrane strains will exist for each of the directions of the two principal axes, such that the number of unknowns twice the number of equations (i.e., the number of grids) will be included in the equations. Thus, the solution of the simultaneous equations is not determined, so that the following method is forced to be employed: these simultaneous equations are solved on the assumption that the strains equal in aspect each other or that the aspect ratio of the strains is given on the assumption that the aspect ratio has already been known. In this way of obtaining a membrane strain, the target specific strain has been obtained independently of the strain given by the heating line. Therefore, any deformation conforming to the target specific strain does not sometimes exist, such that an extra strain cannot be helped but to be given under the actual situation. Then, this extra strain generates the residual stress. Accordingly, it has been impossible to largely enhance the local precision of the obtained curved surface.

By the way, as means for increasing control parameters, the following method is also disclosed, which includes the steps of: erecting a steel plate vertically; supporting the steel plate by supporting devices arranged on upper and lower ends of the steel plate; arranging heating lines on the front and back surfaces of the steel plate; heating the steel plate by moving heat sources arranged on the front and back surfaces of the metal plate along the heating lines arranged thereon simultaneously in synchronization with each other; and obtaining four strain components (see Japanese Patent Application Laid-Open No. H10-146620). As the control parameters, two are set: the moving velocity of the heat source; and the outputs of the heat sources on the front and back surfaces, and thus the four strain components are precisely obtained. However, in this case, there are required: (a) a heating apparatus capable of controlling the heat sources simultaneously in synchronization with each other on both of the front and back surfaces of the steel plate; and (b) large equipments such as devices supporting the steel plate arranged in the vertical direction. Therefore, a heating procedure has been desired, which enables to realize a more accurate target shape of a curved surface by controlling only one control parameter.

SUMMARY OF THE INVENTION

In this connection, it is an object of the present invention to provide a method for calculating a heating procedure of a linear heating, which is prepared for realizing a target shape of a curved surface accurately with precision sufficient for practical use even if a supplied heat is controlled only by one control parameter.

The first aspect of the present invention provides a method for calculating a heating procedure of a linear heating, the method comprising the steps of: determining a distribution of bending principal strains for giving a target shape of a curved surface; dividing calculation grids along directions of the bending principal strains; dividing the directions of the bending principal strains into both a direction of a maximum bending principal strain and a direction of a minimum bending principal strain for each of the calculation grids; determining a heating condition for heating a plurality of heating lines perpendicular to the direction of the maximum bending principal strain, the heating condition defying the maximum bending principal strain; obtaining membrane strains generated accompanying with heating the plurality of heating lines under the heating condition from a database, the database including a relation between the heating condition and deformation components; calculating a distribution of membrane strains required for achieving a deflection of the target shape of the curved surface in consideration of a distribution of the membrane strains obtained from the database; selecting a heating condition satisfying both the maximum bending principal strain and the calculated distribution of the membrane strains; and determining a heating procedure under the selected heating condition.

According to the first aspect of the present invention, it is confirmed that, when the linear heating is executed according to the obtained heating procedure, a heating condition for heating lines perpendicular to the direction of the maximum bending principal strain exists in a database, the heating lines being prepared for realizing a bending deformation to the target shape of a curved surface in the direction of the maximum bending principal strain. Therefore, a bending deformation conforming to the requirement is executed without fail. Meanwhile, a heating condition that satisfies membrane strains required for realizing a deflection of the target shape of a curved surface is selected for the heating lines in the direction of the maximum bending principal strain. Thus, the membrane strains in two principal axis directions are realized precisely. Therefore, the maximum bending principal strain and the membrane strains in the two principal axis directions are realized accurately. Accordingly, even if the minimum bending principal strain hardly affecting the formation of the curved surface is ignored, the bending work is executed with high precision sufficient for practical use.

The second aspect of the present invention provides a method for calculating a heating procedure of a linear heating, the method comprising the steps of: determining a distribution of bending principal strains for giving a target shape of a curved surface; dividing calculation grids along directions of the bending principal strains; dividing the directions of the bending principal strains into both a direction of a maximum bending principal strain and a direction of a minimum bending principal strain for each of the calculation grids; determining a heating condition for heating a plurality of heating lines perpendicular to the direction of the maximum bending principal strain, the heating condition defying the maximum bending principal strain; obtaining membrane strains generated accompanying with heating the plurality of heating lines under the heating condition from a database, the database including a relation between the heating condition and deformation components; calculating a distribution of membrane strains required for achieving a deflection of the target shape of the curved surface in consideration of a distribution of the membrane strains obtained from the database; setting the plurality of heating lines along the direction of the maximum bending principal strain as one set, the plurality of heating lines being perpendicular to the direction of the minimum bending principal strain, and the one set of the plurality of heating lines being arranged parallel one another at a specified interval; obtaining a heating condition for each of the plurality of heating lines such that a sum of the deformation components generated by heating each of the plurality of heating lines allows to give the minimum bending principal strain and the calculated distribution of membrane strains required for achieving a deflection of the target shape of the curved surface; and determining a heating procedure satisfying the maximum principal strain, the minimum bending principal strain and the membrane strains under the obtained heating condition.

According to the second aspect of the present invention, the linear heating is executed in accordance with the obtained heating procedure, whereby all of the maximum and minimum bending principal strains and the membrane strains in the two principal axis directions can be realized accurately. Furthermore, the bending work can be executed with high precision. Consequently, even if the curved surface is twisted largely and asymmetric, in which the bending principal strains in the two principal axis directions are required to be combined accurately with each other, and if the membrane shrinkage is required to be accurately given around the approximate center of the steel plate, the bending work can be executed therefor precisely.

The third aspect of the present invention provides the method for calculating a heating procedure of a linear heating according to the second aspect of this invention, wherein, when a plurality of heating lines perpendicular to the direction of the minimum bending principal strain are set as the one set and disposed parallel at the specified interval, each the one set of the heating lines is arranged separately on front and back surfaces of a steel plate as a material.

According to the third aspect of the present invention, the bending components of the deformations obtained by the heating of one set of the heating lines are canceled with each other, and the sum of the bending components is reduced. Therefore, the heating procedure can be made effective when the membrane shrinkage is large and the bending deformation is small in the required deformation.

The fourth aspect of the present invention provides the method for calculating a heating procedure of a linear heating according to the second aspect of this invention, wherein, when the plurality of heating lines perpendicular to the direction of the minimum bending principal strain are set as the one set and disposed parallel at the specified interval, a width of each of the calculation grids along the direction of the minimum bending principal strain is set, and an absolute amount of the sum of the deformation components, which is generated by heating each of the one set of the heating lines, equals a required deformation amount different for each of the calculation grids located along the direction of the maximum bending principal strain.

According to the fourth aspect of the present invention, the absolute amount of the sum of the generated deformation components can be freely controlled while the ratio of the bending deformation and the membrane deformation is kept at a ratio required for forming the curved surface of the relevant portion. Moreover, while required deformation amounts are satisfied accurately, the required deformation amounts being different from one another in calculation grids arrayed in the direction of the maximum bending principal strain, sets of a plurality of the heating lines can be arranged continuously.

The fifth aspect of the present invention provides the method for calculating a heating procedure of a linear heating according to the first and second aspects of this invention, wherein a heating velocity is adopted as the heating condition, and the database is configured by storing actual measurement values showing relations between the heating velocity and the deformation components.

According to the fifth aspect of the present invention, as the control parameter, the heating velocity can be employed, which is generally used as a control parameter when executing the linear heating.

The sixth aspect of the present invention provides the method for calculating a heating procedure of a linear heating according to the first and second aspects of this invention, wherein a supplied heat is adopted as the heating condition, and the database is configured by storing actual measurement values showing relations between the supplied heat and the deformation components.

According to the sixth aspect of the present invention, as the control parameter, the supplied heat can be employed, which is generally used as a control parameter when executing the linear heating.

BRIEF DESCRIPTION OF THE DRAWINGS

The present invention will now be described with reference to the accompanying drawings wherein:

FIG. 1 is a flowchart of a work process showing a first preferred embodiment of a method for calculating a heating procedure of a liner heating of the present invention;

FIG. 3 is a conceptual graph showing one example of a database for use in Step S3 of FIG. 1;

DETAILED DESCRIPTION OF THE PREFERRED EMBODIMENTS

Hereinafter, in order to describe the present invention more in detail, preferred embodiments of this invention will be explained with reference to the accompanying drawings below.

(First Preferred Embodiment)

Figure 2A:
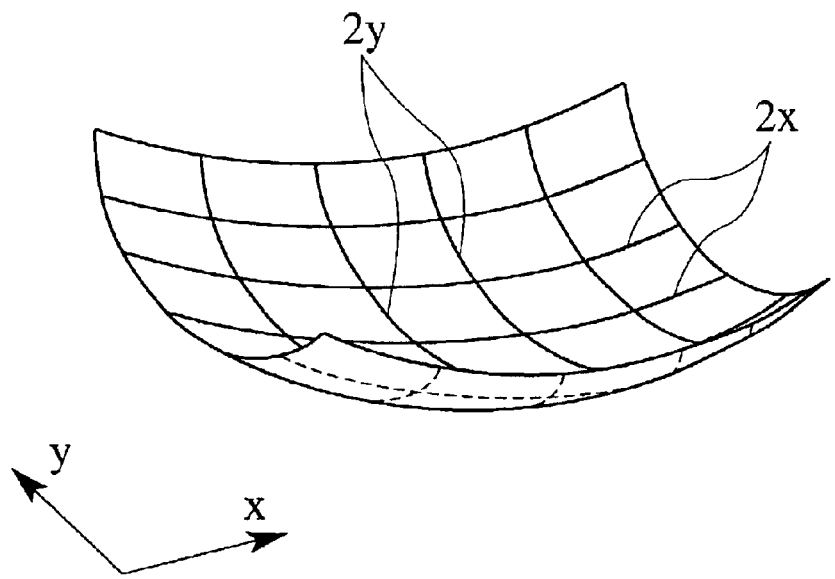
FIG. 2A is a view showing one example of a method for obtaining a distribution of bending principal strains by Step S1 of FIG. 1, and showing a target shape of a curved surface, for which the heating procedure is to be calculated.
Figure 2B:
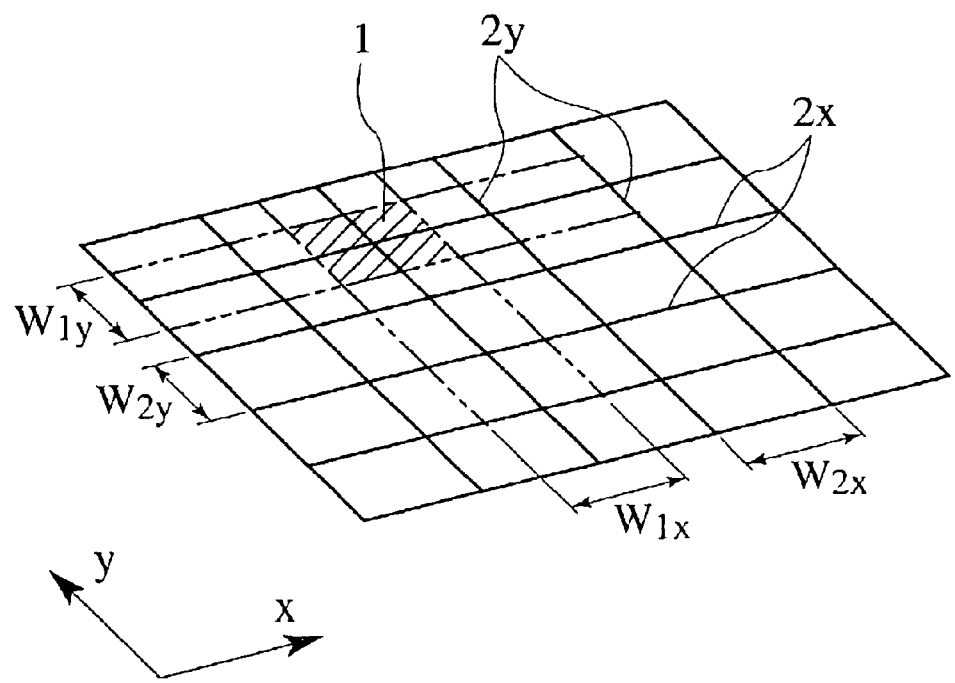
FIG. 2B is a view showing a plane shape formed by forcibly deforming the shape of FIG. 2A by an elastic FEM calculation.

FIG. 1 is a flowchart of a work process showing a first preferred embodiment of a method for calculating a heating procedure of a liner heating of the present invention. Note that a target shape of a curved surface to be subjected to bending work by a linear heating is, for example as shown in FIGS. 2A and 2B, made to be a rectangular form having long sides in the x-direction and short sides in the y-direction in each of all the preferred embodiments of the present invention. The target shape of a curved surface is made to be a saucer-shaped form curved loosely in the x-direction and tightly in the y-direction. In general, when the saucer-shaped form as shown in FIG. 2A is developed, lines 2x and 2y along directions of principal curvatures (the principal curvatures corresponding to principal strains) of the saucer-shaped form of FIG. 2A becomes curved. However, in FIG. 2B, the lines along the directions of the principal curvatures (the principal curvatures corresponding to principal strains) are shown as straight lines in order to simplify the below explanation, and the represented directions are shown as the x- and y-directions (The same will be applied to later descriptions with reference to FIGS. 6 and 10).

The saucer-shaped target shape of a curved surface is given. Next, in Step S1, the saucer-shaped target shape of the curved surface as an initial shape shown in FIG. 2A is forcibly deformed to a plane as shown in FIG. 2B by an elastic FEM calculation. A distribution of bending principal strains in this forcibly deformed plane is obtained. Thus, in FIG. 2B, the curved directions of the target shape of the curved surface are set along the x- and y-directions. Therefore, the principal bending strains will be distributed along directions of two principal axes perpendicular to each other, that is, the x-direction as the minimum bending principal strain and the y-direction as the maximum bending principal strain.

Next, as shown by two-dot chain lines in FIG. 2B, calculation grids 1 are divided and set along the directions of the bending principal strains (i.e., x- and y-directions) obtained in the above-described Step S1 (Step S2). The width of each calculation grid 1 in the x-direction is defined as $W_{1x}$, and the width thereof in the y-direction is defined as $W_{1y}$. The heating lines 2x and 2y are shown by solid lines in FIGS. 2A and 2B. In this case, an interval $W_{2x}$ between the heating lines 2y adjacent to each other in the x-direction coincides with the width $W_{1x}$ of the calculation grid 1 in the x-direction. Further, an interval $W_{2y}$ between the heating lines 2x adjacent to each other in the y-direction coincides with the width $W_{1y}$ of the calculation grid 1 in the y-direction. In this manner, the integral values of the bending strains in each calculation grid 1 are set so as to correspond to the bending deformations brought by the heating lines 2x and 2y. Finally, the array of one column or row of the calculation grids 1 is set so as to correspond to one set of the heating lines 2x or 2y.

When the heating is actually carried out along one heating line by the linear heating, four deformation components are simultaneously generated. The four deformation components are: bending and membrane-shrinkage deformations in the perpendicular direction of the heating line; and bending and membrane-shrinkage deformations in the tangential direction of the heating line. Final amounts of these four deformation components are determined by the change degree of a temperature distribution in the steel plate over time due to the heating. Therefore, actual measurement values of deformation amounts δ in the case of carrying out the linear heating are previously stored, while variously changing several heating conditions, for example, a heating velocity v (that is, a moving velocity of a heat source) used generally as a control parameter for the linear heating. Then, the stored values are prepared as a database as shown in FIG. 3 (Step S3). Note that the line A in FIG. 3 is a curve showing a relationship between the heating velocity v and the bending deformation δb. The line B is a curve showing a relationship between the heating velocity v and the membrane-shrinkage deformation δm.

Subsequently, in Step S4, the two directions of the bending principal strains, which have been obtained in the above-described Step S1, are divided into the direction of the maximum bending principal strain (y-direction) and the direction of the minimum bending principal strain (x-direction). Then, in Step S5, with regard to the heating lines 2x perpendicular to the direction of the maximum bending principal strain (the heating lines 2x extended to the direction of the minimum bending principal strain), the bending deformation amount $\delta b_0$ is obtained by integrating bending strains in the respective points of the heating lines 2x across the interval (i.e., width of the grid) between the heating lines. The bending deformation amount $\delta b_0$ is confirmed such that the maximum bending principal strain for forming the target shape of a curved surface can be realized accurately. Further, the heating velocity $v_x$ of the heating lines for realizing the bending deformation amount $\delta b_0$ is confirmed in the database based on the relationship between the heating velocity v and the bending deformation δb. The relationship is shown by the line A of FIG. 3. In the case of employing the heating velocity $v_x$ as a heating condition of these heating lines 2x, the membrane-shrinkage deformation amount $\delta m_0$ generated accompanying with the bending deformation amount $\delta b_0$ is obtained based on the relationship between the heating velocity v and the membrane deformation δm. The relationship is shown by the line B in FIG. 3. Then, the distribution of the membrane strains in this case is obtained.

Thereafter, with regard to the heating lines 2y perpendicular to the direction of the minimum bending principal strain (the heating lines 2y extended to the direction of the maximum bending principal strain), the distribution of the membrane strains required for giving the deflection of the target shape of a curved surface in the x-direction is determined in consideration of the membrane strains generated when heating the heating lines 2x in the x-direction, the membrane strains being obtained in the above-described Step S5 (Step S6).

Here, description will be made in detail for a method for determining the distribution of the membrane strains giving the deflection of the target shape of a curved surface in the x-direction in the above-described Step S6. The strains giving the target shape of the curved surface are composed of the bending strain component and the membrane strain component. The bending strain component and the membrane strain component are independent of each other. Only one bending strain exists corresponding to one shape of the curved surface. Moreover, the bending strain is proportional to the curvature in each region of the curved surface.

Meanwhile, the membrane strains infinitely exist when generating the deflection of the same curved surface. In the case of paying attention to one membrane strain in a certain location, when there exists a relationship satisfying a certain condition between this membrane strain and peripheral membrane strains, it is made possible to generate a deflection required at the location. The relationship between the strain and the deflection is called a "compatibility equation" in the theory of a large deflection of a plate. This compatibility equation is represented by a relationship as follows: when a certain spot is set as a center, the sum of second-order differentials of the membrane strains at the center in a direction perpendicular to the direction of the membrane strain is equal to a degree of incompatibility R at the center for each of the membrane strains and shearing strains in the x-direction and the y-direction. In the present invention, the following Equation (1) about the above-described compatibility equation is established, in which the left side does not include the shearing strain but include only the membrane strains, since the entire strains are selected in the principal strain direction.

$$\frac{\partial^2 \varepsilon_{my}}{\partial x^2} + \frac{\partial^2 \varepsilon_{mx}}{\partial y^2} = R \qquad \text{Eq. (1)}$$

In Equation (1), the degree of incompatibility R is obtained by inverting a value code of a curvature of a solid. The curvature of the solid represented by the product of the two principal curvatures in the shape of the curved surface. The principal curvature of the target shape of the curved surface in the direction of the minimum bending principal strain (x-direction) is defined as $k_x$, and the principal curvature of the target shape of a curved surface in the direction of the maximum bending principal strain is defined as $k_y$. Then, R is defined as follows:

$$R = -(k_x \times k_y)$$

The value of R has already been given when the target shape of the curved surface is given. R is a value obtained from the distribution of the bending strains or the curvature of the curved surface.

Accordingly, the distribution of the membrane strains is obtained in the following manner. Specifically, second-order partial differential equations (i.e., Equations (1)) represent the compatibility equations between the membrane strains and the deflections of the curved surface. Second-order finite difference equations are obtained by approximating the second-order partial differential equations by using the Finite Difference Method, and then the second-order partial differential equations are established in the points of the respective grids. Then, these second-order finite difference equations are made simultaneous.

In the present invention, in Equation 1, $\varepsilon_{my}$ and $\varepsilon_{mx}$ are defined as follows:

$\varepsilon_{my}$=(tangential component of membrane strain given by heating line 2x in direction of minimum bending principal strain)+(perpendicular component of membrane strain given by heating line 2y in direction of maximum bending principal strain)

$\varepsilon_{mx}$=(perpendicular component of membrane strain given by heating line 2x in direction of minimum bending principal strain)+(tangential component of membrane strain given by heating line 2y in direction of maximum bending principal strain)

With regard to $\varepsilon_{my}$ and $\varepsilon_{mx}$, the (tangential component of membrane strain given by heating line 2x in direction of minimum bending principal strain) and the (perpendicular component of membrane strain given by heating line 2x in direction of minimum bending principal strain) are values obtained in association with $\delta m_0$ based on the database in the above-mentioned Step S5. Therefore, the (perpendicular component of membrane strain given by heating line 2y in direction of maximum bending principal strain) and the (tangential component of membrane strain given by heating line 2y in direction of maximum bending principal strain) are unknowns in the simultaneous equations. However, it is conceived that the (tangential component over perpendicular component) of $\varepsilon_m$ is constant and known. Thus, the unknown in one equation exists $\varepsilon_{mx}$ alone, and the number of independent equations becomes equal to the number of unknowns, and therefore, the simultaneous equations are solved. Accordingly, the membrane strains for giving the deflection of the target shape of the curved surface can be calculated.

Thereafter, with regard to the heating lines 2x in the x-direction for giving the maximum bending principal strain, the heating velocity $v_x$ satisfying the maximum bending principal strain of the target shape of the curved surface, which has been confirmed in Step S5, is selected as the heating condition. Meanwhile, with regard to the heating lines 2y in the y-direction for giving the minimum bending principal strain, the specified heating velocity v is selected, the specified heating velocity v satisfying the membrane strains required for realizing the deflection of the target shape of the curved surface. Therefore, the heating procedure is determined.

In accordance with the above-described heating procedure, in the planar steel plate shown in FIG. 2B, the heating velocity v is employed as the control parameter, and the linear heating is carried out. It has been confirmed in Step S5 that the heating velocity $v_x$ exists in the database, the heating velocity $v_x$ being related to the heating lines 2x in the x direction for realizing the target shape of the curved surface. Therefore, with regard to the bending deformation in the y-direction, a bending deformation meeting a request for the target shape of the curved surface is always executed.

Meanwhile, in Step S7, the heating velocity v is selected as the heating condition for the heating lines 2y in the y-direction so as to satisfy the membrane strains required for realizing the deflection of the target shape of the curved surface. The membrane strains are realized accurately also by heating the heating lines 2y in accordance with the selected heating velocity v. However, the bending strain in the x direction, which is generated accompanying with the selected heating velocity v, does not generally coincide with the required minimum bending principal strain. However, the maximum bending principal strain in the y-direction and the membrane strains in the two principal axis directions are realized precisely. Accordingly, even if the minimum bending principal strain hardly affecting the formation of the curved surface is ignored, the bending work can be executed with high precision sufficient for practical use.

According to the method for calculating a heating procedure of the present invention, the bending and membrane strains are referred to as the database, the bending and membrane strains being included in the deformations (discrete strains) obtained by actually heating the heating lines. Thus, the relationship between the bending and membrane strains generated accompanying with the heating for the heating lines arranged perpendicularly to each other is concretely determined, and the number of variables in the "compatibility equation" shown in Equation (1) is decreased. Therefore, the equations can be made into forms capable of solving the simultaneous equations. Furthermore, it can be assured that the constitution of the strain components selected by solving the simultaneous equations is a constitution that can be realized by the actual heating.

Also, such a strain that can be realized at the heating velocity v as the existing heating condition is determined in the step of obtaining a continuous target specific strain. Thus, such a calculated efficient heating procedure can generate a curved surface with a little residual stress. In addition, the optimum strain distribution is determined in the step of obtaining a target specific strain. Therefore, the load of an optimization calculation for selecting the heating condition (i.e., heating velocity) for each heating line is reduced, and a time for calculating convergence of the heating velocity can be shortened.

(Second Preferred Embodiment)

FIGS. 4 to 9B show a second preferred embodiment of the present invention. In a method for calculating a heating procedure, the method is approximately similar to the first preferred embodiment described with reference to FIG. 1. However, the heating lines in the direction of the maximum bending principal strain (y-direction), which are arranged in the calculation grid 1, are made into sets, each of the sets having two heating lines 21y and 22y arranged parallel at a specified interval instead of one heating line 2y. Further, with regard to the heating lines 2x in the direction of the minimum bending principal strain (x-direction) perpendicular to the direction of the maximum bending principal strain (y-direction), a heating velocity $v_x$ is selected, the heating velocity $v_x$ giving a bending deformation amount capable of realizing the maximum bending principal strain of the target shape of the curved surface. Then, the one set of the two heating lines 21y and 22y are individually heated. In this case, the respective heating velocities of the heating lines 21y and 22y are selected. Thus, the sum of deformation components on spots heated by the heating lines 21y and 22y gives both the membrane strains required for defining the deflection of the target shape of the curved surface in the x-direction and the bending deformation satisfying the minimum bending principal strain. Accordingly, a heating procedure is to be determined, in which the maximum and minimum bending principal strains (that is, bending principal strains in two principal axis directions) and the membrane strains in the two principal axis directions are realized.

Figure 4:
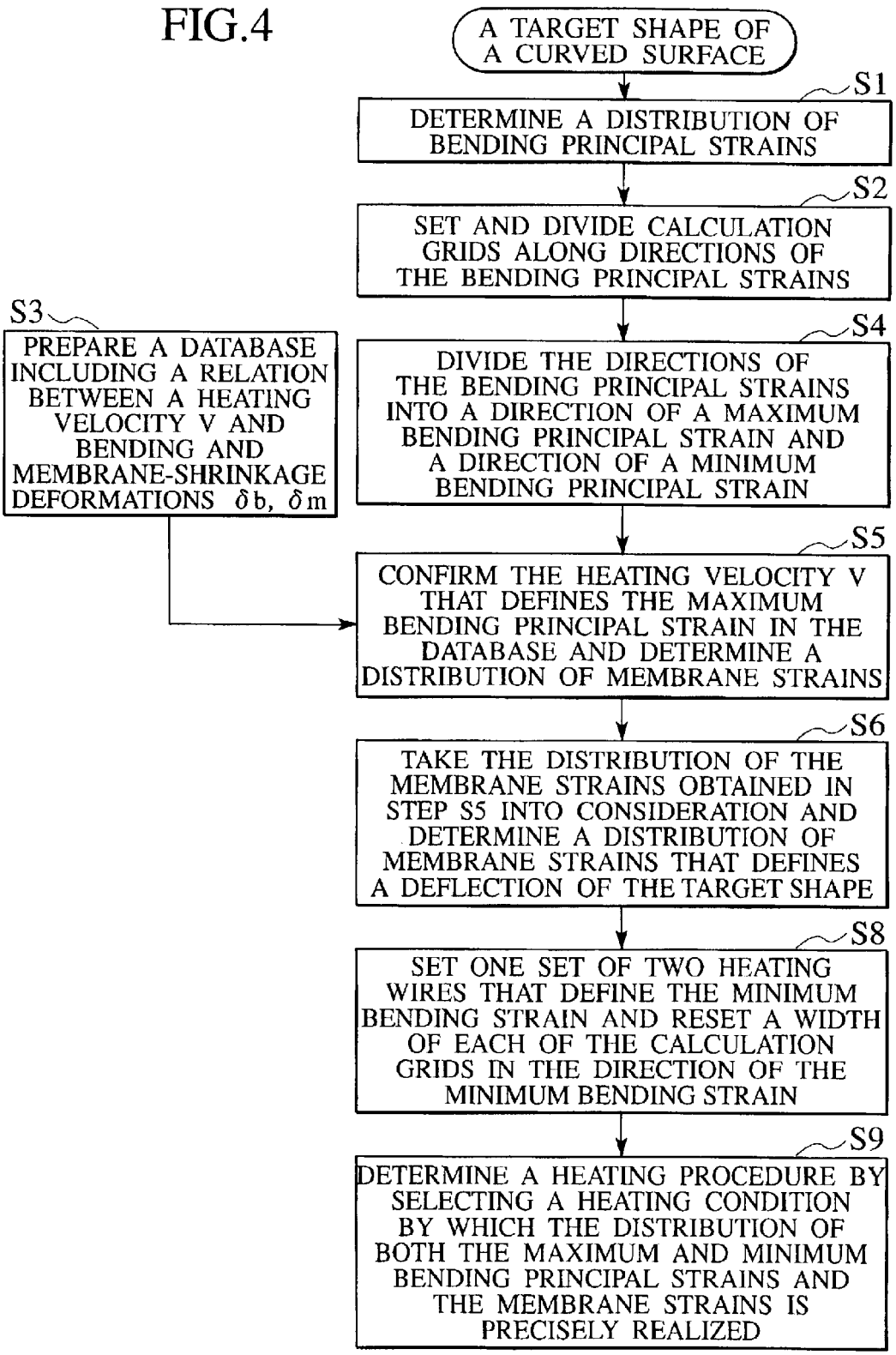
FIG. 4 is a flowchart showing a work process showing a second preferred embodiment of the present invention.

FIG. 4 shows a flowchart of a work process of the second preferred embodiment. Similarly to Steps S1 to S6 shown in FIG. 1, first, the distribution of the bending principal strains of the target shape of the curved surface is obtained (Step S1). Thereafter, the calculation grids 1 are divided and set along the directions of the obtained bending principal strains (that is, the x-direction serving as the direction of the minimum bending principal strain and the y-direction serving as the direction of the maximum bending principal strain) as shown in FIG. 2B (Step S2). In this case, with regard to the calculation grids 1 set in Step S2, the interval $W_{2x}$ between the mutually adjacent heating lines 2y in the x-direction coincides with the width $W_{1x}$ of the calculation grids 1 in the x-direction similarly to Step S2 in the preferred embodiment described with reference to FIG. 1. Further, the interval $W_{2y}$ between the mutually adjacent heating lines 2x in the y-direction coincides with the width $W_{1y}$ of the calculation grids 1 in the y-direction. The integral values of the bending strains in each calculation grid 1 are set so as to correspond to the bending deformations brought by the heating lines 2x and 2y. However, the heating lines 2y are set as tentative heating lines for dividing the calculation grids 1. Heating lines for using in executing the linear heating are reset as sets of heating lines, each of the sets having two heating lines 21y and 22y in Step S8 to be described later.

Meanwhile, the database as shown in FIG. 3, which has stored actual measurement values of deformation amounts δ with respect to the heating velocity V, is previously prepared (Step S3). Thereafter, the two directions of the bending principal strains, which have been obtained in Step S1, are divided into both the direction of the maximum bending principal strain (y-direction) and the direction of the minimum bending principal strain (x-direction) (Step S4). The heating velocity $v_x$ is confirmed based on the relationship (line A) between the heating velocity v and the bending deformation δb in the database prepared in Step S3 and shown in FIG. 3. The heating velocity $v_x$ gives the bending deformation amount $\delta b_0$ enabling to realize the maximum bending principal strain of the target shape of the curved surface to the heating lines 2x (heating lines in the direction of the minimum bending principal strain). The membrane-shrinkage deformation amount $\delta m_0$ is generated accompanying with the heating of the heating lines 2x at the heating velocity $v_x$. Also, the membrane-shrinkage deformation amount $\delta m_0$ is obtained based on the relationship (line B) between the heating velocity v and the membrane deformation δm, which is shown in FIG. 3, and the distribution of the membrane strains in this case are obtained (Step S5). Next, the distribution of the membrane strains is obtained in consideration of the membrane strains generated accompanying with the heating of the heating lines 2x in the x-direction (Step S6). The distribution of the membrane strains is required for giving the deflection of the target shape of the curved surface in the x-direction, the membrane strains having been obtained in the above-described Step S5.

Thereafter, instead of the tentative heating lines 2y extended in the y-direction and have been set in Step S2, the sets of heating lines are set, each of the sets having two heating lines 21y and 22y arranged parallel at a specified interval. In this case, the width of each of the calculations grids 1 in the direction of the minimum bending principal strain (x-direction) is reset, such that the sum of the deformation components generated by the heating lines 21y and 22y of the respective sets can give both the distribution of the membrane strains and the bending deformation satisfying the minimum bending principal strain (Step S8). The distribution of the membrane strains is required for giving the deflection of the target shape of the curved surface in the x-direction, the distribution having been obtained in Step S6.

Here, Step S8 will be described in detail.

Figure 5:
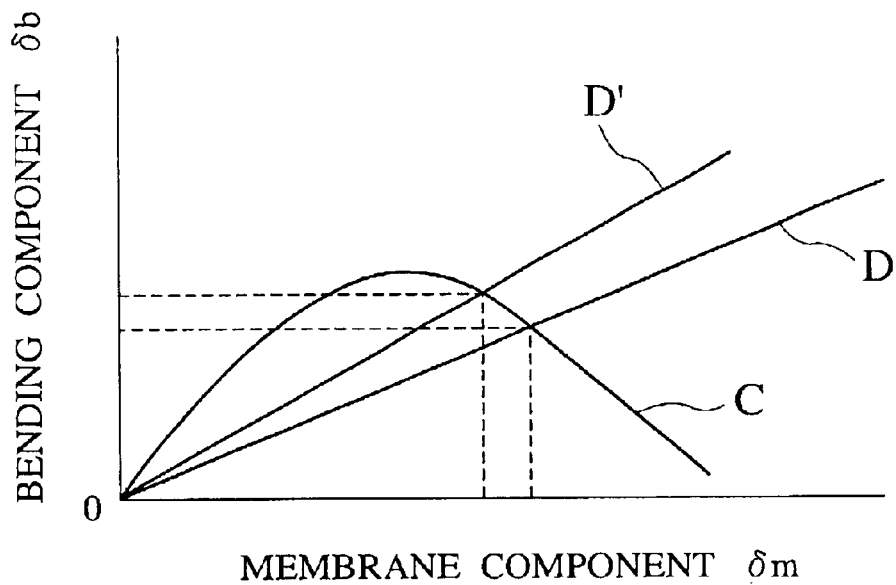
FIG. 5 is a graph showing deformations obtained by heating one heating line.

FIG. 3 shows the relationship (line A) between the heating velocity v and the bending deformation component δm in the database, and shows the relationship (line B) between the heating velocity v and the membrane-shrinkage deformation component δm. Based on the lines A and B, a relationship shown by the line C in FIG. 5 is introduced between the bending component δb and the membrane component δm in the deformation given by one heating line. When the heating velocity v as the control parameter is determined, each value of the bending component δb and the membrane component δm is determined as shown as one point on the line C. In addition, as the heating velocity v increases, values taken by both the bending component bb and the membrane component δm are continuously changed on the line C from the positive values (the positive values corresponding to a right side in FIG. 5) to the origin. Therefore, the deformation shown by the continuous line C can be realized entirely.

Meanwhile, it is required that a deformation having a specified ratio of the bending component δb to the membrane component δm (δb/δm) be given. Thus, both the membrane strains required for giving the deflection of the target shape of the curved surface in the x-direction and the minimum bending principal strain in each of the calculation grids 1 are realized, the deflection having been obtained in Step S6. A region satisfying such a required condition can be shown as the line D in FIG. 5, the line D with the δb/δm as a gradient passing through the origin.

The heating velocity v is selected as a heating condition for one heating line 2y arranged in the direction of the maximum bending principal strain (y-direction) in one calculating grid 1. The heating velocity v realizes the deformation having the bending component δb and the membrane component δm, the deformation being shown by the point where the lines C and D intersect with each other. Accordingly, it is conceived to be made possible that, in the calculation grid 1, both the bending component giving the minimum bending principal strain of the target shape of the curved surface and the membrane strains required for giving the deflection of the target shape of the curved surface in the x-direction be realized entirely.

However, the absolute amount of the deformation regulates an interval between the adjacent heating lines. Thus, in the case where the δb/δm required in a calculation grid 1 adjacent to a certain calculation grid 1 in the y-direction is changed (e.g., in the case where the required δb/δm increases) with regard to one heating line 2y extended to the direction of the maximum bending principal strain, a region satisfying the required condition becomes a region shown by the line D' in FIG. 5. The point (coordinate) of the intersection of the lines D' and C is changed. Hence, the bending component δb and the membrane component δm in the deformation, which are introduced by the intersection, are changed. Therefore, the absolute amount of the deformation is changed. In order to prevent the absolute amount of the deformation from being changed, it is necessary to change the interval between the heating lines extended to the y-direction. The interval is required for each calculation grid 1 adjacent to the other in the y-direction (i.e., width of the calculation grid 1 in the direction of the minimum bending strain (x-direction)). However, it is actually necessary to arrange the heating lines in the y-direction continuously with the calculation grids (regions) 1 located in the y-direction. Thus, it is required that the widths of the calculation grids located in the y-direction substantially equal one another. As a result, by selecting the heating velocity v of the one heating line 2y as described above, it is not possible to give the deformation having the δb/δm required for realizing the membrane strains necessary for giving the deflection of the target shape of the curved surface in the x-direction and realizing the minimum bending principal strain.

Figure 6:
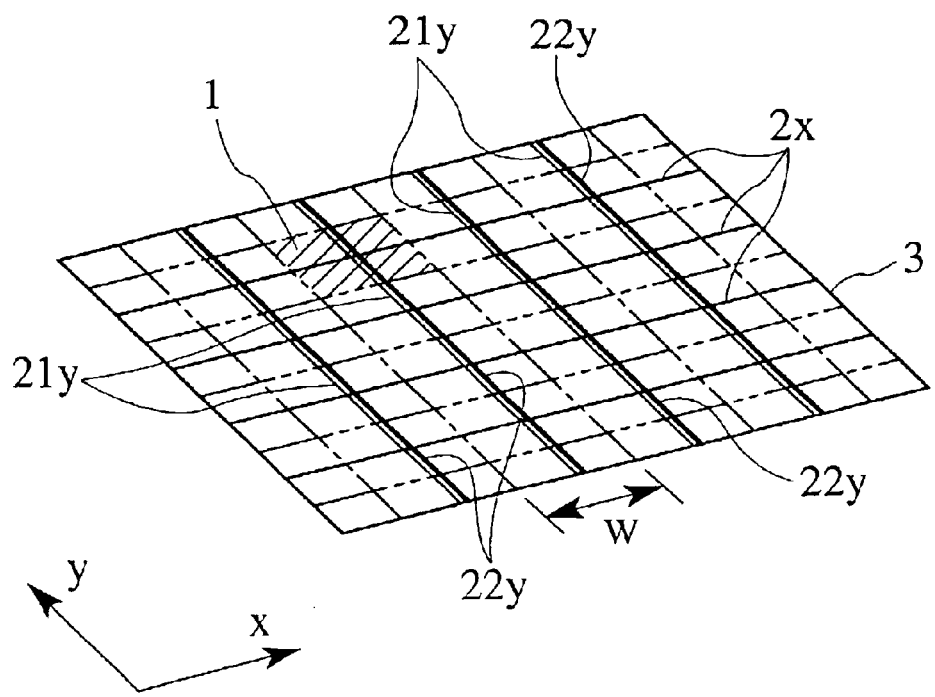
FIG. 6 is a view showing heating lines set in Step S8 of FIG. 4.

In this connection, in the method for calculating a heating procedure in the second preferred embodiment, as shown in FIG. 6, sets of heating lines, each set having two heating lines 21y and 22y arranged parallel at a specified interval, are set as the heating lines extended to the y-direction on the surface of the steel plate 3 as a material. The heating velocities v are selected as the heating conditions for the respective heating lines 21y and 22y. Thus, the sum of the deformation components made by the respective heating lines 21y and 22y makes it possible to realize the ratio (δb/δm) of a specified bending component δb to a specified membrane component δm. The ratio described above is required for obtaining the membrane strains necessary for giving the deflection of the target shape of the curved surface in the x-direction. The deflection has been obtained in the above-described Step S6. The bending deformation is obtained for realizing the minimum bending principal strain. It is preferable that the heating lines 21y and 22y be made close to each other within a range where heated widths and the like do not interfere with each other at the time of the heating along the heating lines 21y and 22y by using a heat source (not shown). For example, such an interval between the heating lines 21y and 22y is set at approximately 150 mm. Note that FIG. 6 displays the heating lines 21y and 22y differently in thickness. However, the thicknesses of the heating lines in FIG. 6 do not reflect the sizes of the heating widths by the heat source or the actual thicknesses of the heating lines. FIG. 6 displays the heating lines 21y and 22y, in which the heating velocities v as the heating condition can be set individually, so as to be seen differently in thickness only for the purpose of discrimination between the heating lines 21y and 22y.

Figure 7A:
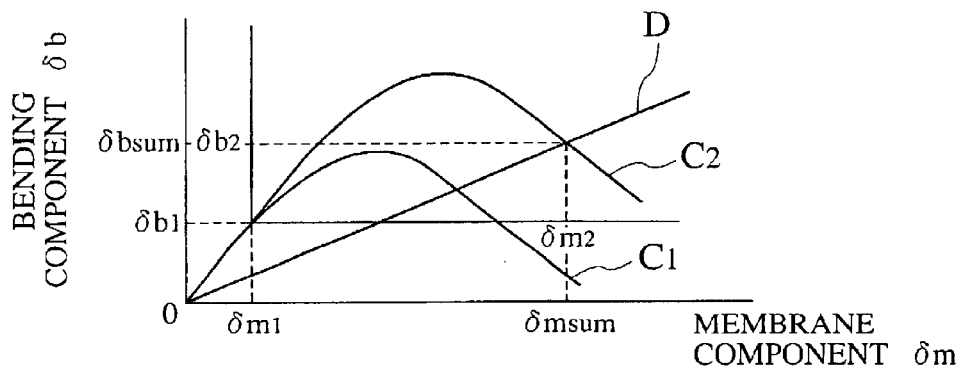
FIGS. 7A and 7B are graphs, both exemplifying deformations obtained when deformations by two heating lines are added together.
Figure 7B:
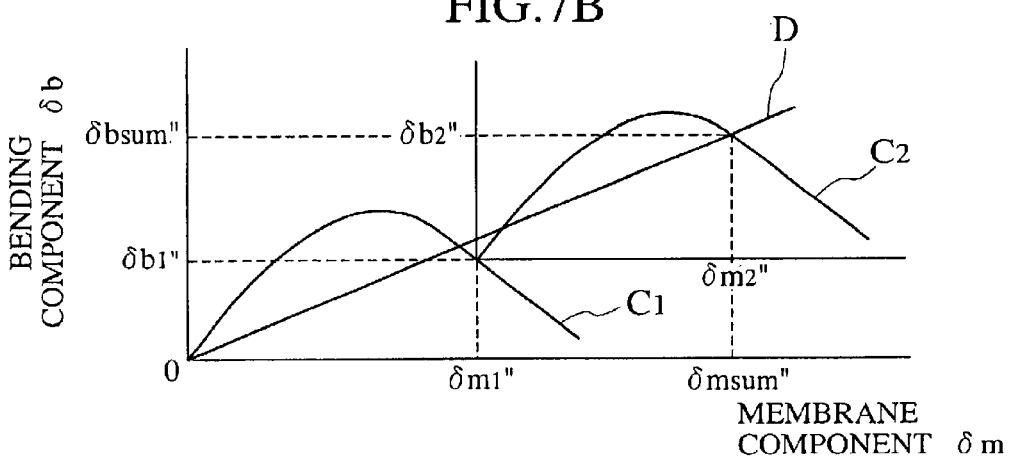

When each of the heating lines 21y and 22y is singly heated, the relationship between the bending component δb and the membrane component δm in the deformation is obtained. Furthermore, the relationship is represented as a curve similar to the line C in FIG. 5, as shown by the lines Cl (for heating line 21y) and the lines C2 (heating line 22y) in FIGS. 7A and 7B. As shown in FIGS. 7A and 7B, a certain point on the line C1 shows the deformation that can be realized by the heating of the heating line 21y as one in the sets. Then, the certain point is set as an origin, and the line C2 is displayed from the origin so as to be partially superposed on the line C1, the line C2 showing the deformation that can be realized by the heating of the heating line 22y as the other of the sets. Moreover, the intersection of the line C2 and the straight line D is obtained, the straight line D having a gradient of the required δb/δm. Thus, a heating condition is determined by the sum of the deformation components obtained by the two heating lines 21y and 22y so as to realize the required δb/δm. The membrane strains necessary for giving the deflection of the target shape of the curved surface in the x-direction and the bending deformation satisfying the minimum bending principal strain are determined by the required δb/δm. For example, as shown in FIG. 7A, a heating velocity $v_1$ is selected as a heating condition for the heating line 21y, thereby obtaining both a bending component $δb_1$ and a membrane component $δm_1$. As a heating condition for the heating line 22y, a heating velocity $v_2$ is selected, thereby obtaining both a bending component $δb_2$ and a membrane component $δm_2$. Further, as shown in FIG. 7B, a heating velocity $v_1'$ is selected as a heating condition for the heating line 21y for obtaining a bending component $δb_1'$ and a membrane component $δm_1$. As a heating condition for the heating line 22y, a heating velocity $v_2$ is selected for obtaining a bending component $δb_2'$ and a membrane component $δm_2$. Hence, when the deformations of the one set of the two heating lines 21y and 22y are added together, the distribution of the deformations is obtained. The distribution is represented as a region E shown by the hatching in FIG. 8 in the inside of an envelope obtained by adding together two of the lines C showing the deformations that can be realized.

Figure 8:
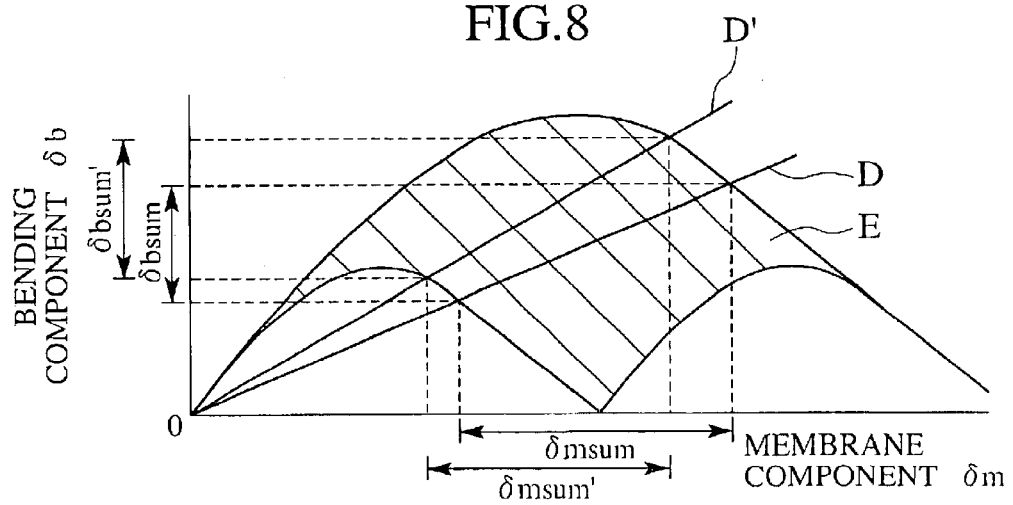
FIG. 8 is a graph showing a distribution of deformation components obtained when the deformations by the two heating lines arranged with reference to FIGS. 7A and 7B are added together.

Incidentally, both of the heating conditions shown in FIGS. 7A and 7B are the conditions for realizing the δb/δm represented by the straight line D. However, with regard to the obtained sums of the bending components of the deformation, while the sum of the bending components is $δb_{sum}$ and the sum for the membrane components is $δm_{sum}$ in FIG. 7A, the sums in FIG. 7B are $δb_{sum}$ and $δm_{sum}$, respectively. Although the required δb/δm is the same, the absolute amounts of the deformations are different from each other. Therefore, as shown in FIG. 8, if the δb and the δm are selected in a range where the straight line D is superposed on the region E, the heating condition for satisfying the δb/δm shown by the straight line D can be realized. In this case, the respective sums $\delta b_{sum}$ and $\delta m_{sum}$ of the deformation components can take values in the ranges specified therefor in FIG. 8.

In FIG. 8, in the case where the δb/δm, which is required for realizing the membrane strains necessary for giving the deflection of the target shape of the curved surface in the x-direction and for realizing the minimum bending principal strain, is changed as shown by the straight line D', the heating condition can be selected in a range where the straight line D' is superposed on the region E. The sums of the deformation components in this case can take values in the ranges shown by $\delta b_{sum}$ and $\delta m_{sum}$, respectively.

Accordingly, if a common region is selected as the sums of the deformation components through the entire length of the heating lines 21y and 22y continuous in the y-direction, then the deformation can be given, the deformation satisfying the δb/δm required in all the regions located in the y-direction. Moreover, the absolute amount of the deformation can be conformed to the value required in each region, so that the interval between the sets of the heating lines 21y and 22y does not need to be changed.

Therefore, in Step S8, as shown in FIG. 6, the width of each calculation grid 1 in the x-direction, the each calculation grid 1 being located in the y-direction, is reset as the width W corresponding to the absolute amount in the common region to the sums of the deformation components, the common region having been selected as described above.

Thereafter, the width of the calculation grid 1 is determined, and thus the absolute amount of the deformation by the δb and the δm is determined. Hence, the heating velocities $v_1$ and $v_2$ for the heating lines 21y and 22y may satisfactorily be calculated for each calculation grid 1, respectively. Therefore, the δb and the δm are realized, which are introduced from the absolute amount of the deformation. Note that the heating velocities $v_1$ and $v_2$ for the two heating lines 21y and 22y realizing the required deformation are obtained, respectively, at the step where all the heating lines 21y and 22y have been arranged. Then, the distributions of the bending strains єb and the membrane strains єm have been obtained, which are necessary for forming the curved surface. In this case, the heating velocities $v_1$ and $v_2$ have already been limited, and the realization of the required deformation has been assured at the step of selecting and resetting the interval between the sets, each of the sets having the heating lines 21y and 22y (i.e., width W of the calculation grid 1).

Figure 9A:
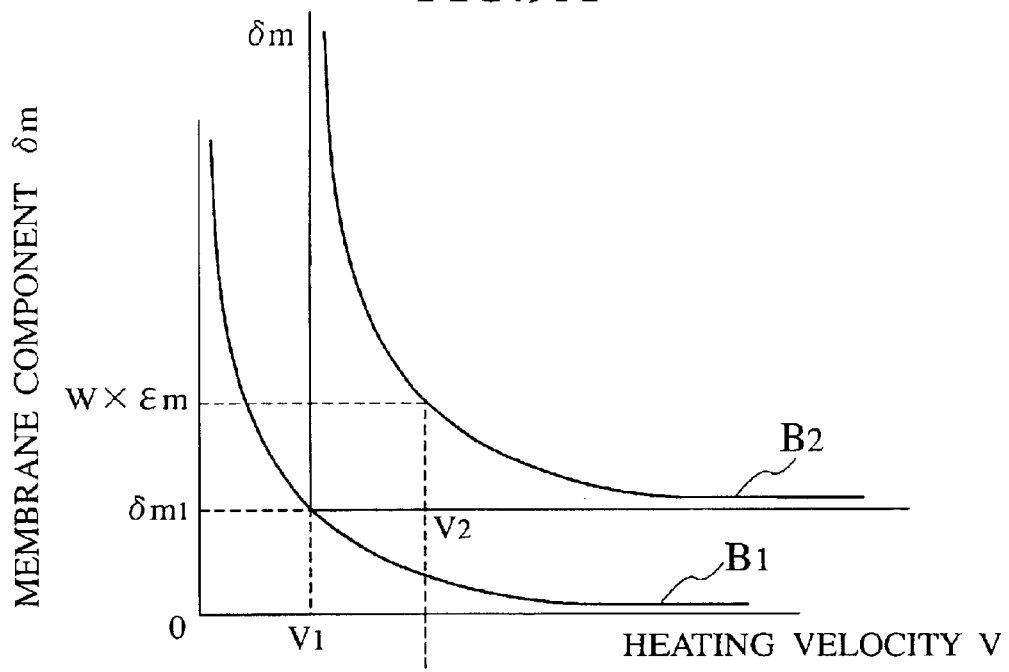
FIG. 9A is a graph schematically showing a method for obtaining heating velocities of the heating lines in Step S8 of FIG. 4, and showing sums of membrane components of the deformations obtained by the two heating lines.
Figure 9B:
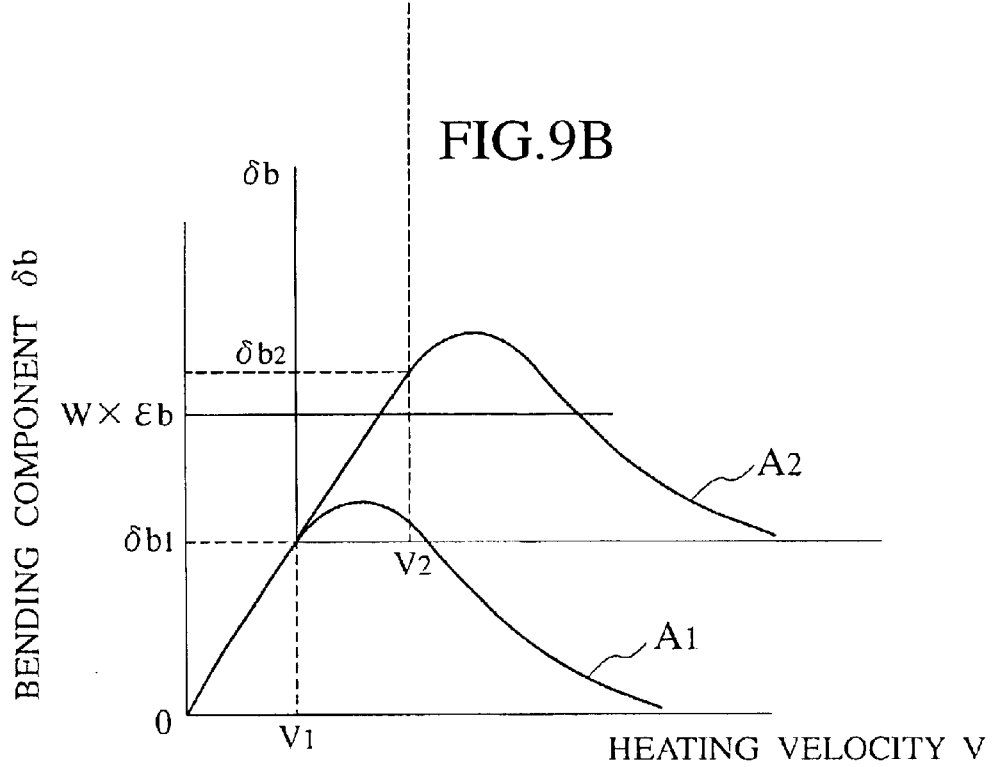
FIG. 9B is a graph schematically showing the method for obtaining heating velocities of the heating lines in Step S8 of FIG. 4, and showing sums of bending components of the deformations obtained by the two heating lines.

With regard to a method for calculating the heating velocities $v_1$ and $v_2$, for example as shown in FIG. 9A, curves show the relations between the heating velocities v and the membrane deformations δm during the heating by the two heating lines 21y and 22y. The curves are denoted as B1 (for heating line 21y) and B2 (for heating line 22y), respectively, and the curves are made possible to be displayed in a superposed style. Similarly, as shown in FIG. 9B, curves show the relations between the heating velocities v and the bending deformations δb during the heating by the two heating lines 21y and 22y. The curves are denoted as A1 (for heating line 21y) and A2 (for heating line 22y), respectively, and the curves are made possible to be displayed in a superposed style. The membrane deformation required in the calculation grid 1 will be represented as a value (W×єm) obtained by integrating the required membrane strains єm across the width W of the calculation grid 1 in the x-direction. Meanwhile, the bending deformation required in the calculation grid 1 will be represented as a value (W×єb) obtained by integrating the required bending strain єb across the width w of the calculation grid 1.

Here, if it is assumed that the heating velocity of the heating line 21y is $v_1$, the membrane deformation obtained by the heating of the heating line 21y will be $\delta m_1$. Accordingly, the heating velocity $v_2$ of the heating line 22y is determined as a heating velocity realizing a difference (i.e., membrane deformation W×єm–$\delta m_1$) between the required membrane deformation (W×єm) and the membrane deformation $\delta m_1$ obtained by the heating of the heating line 21y, the difference depending on the above-described heating velocity $v_1$.

The heating velocities $v_1$ and $v_2$ are determined as described above, and then the bending deformation is given as $\delta b_1$ at the time where the heating line 21y is heated at the heating velocity $v_1$. Meanwhile, the bending deformation is given as $\delta b_2$ at the time where the heating line 22y is heated at the heating velocity $v_2$. Therefore, the sum of the bending deformations generated by the heating lines 21y and 22y will be represented as $\delta b_1 + \delta b_2$.

Since the required bending deformation is represented as W×єb, a difference between the sum of the generated bending deformations $\delta b_1 + \delta b_2$ and the target bending deformation W×єb will be represented as a function $f(v_1)$ as in the following equation:

$$f(v_1) = \delta b_1 + \delta b_2 - W \times \epsilon b$$

The value of the heating velocity $v_1$ is obtained as a solution of the following equation: $f(v_1) = 0$. This solution is determined by converging the equation by use of an exploratory solution-obtaining procedure such as the Newton's method and the like. Moreover, the heating velocity $v_2$ is calculated by the heating velocity $v_1$.

Thereafter, in Step S9, with regard to the heating lines 2x in the x-direction, the heating lines 2x being for giving the maximum bending principal strain, the heating velocity $v_x$ is selected as the heating condition. The heating velocity $v_x$ satisfies the maximum bending principal strain of the target shape of the curved surface, the heating velocity $v_x$ having been confirmed in Step S5. Meanwhile, with regard to the heating lines 21y in the y-direction, the heating lines 22y being for giving the minimum bending principal strain, the heating velocity $v_1$ obtained in Step S8 is selected as the heating condition. With regard to the heating lines 22y, the heating velocity $v_2$ is selected as the heating condition. In the manner described above, the heating procedure is determined.

According to the second preferred embodiment, the linear heating for the planar steel plate shown in FIG. 6 is executed by using the heating lines 2x in the x-direction with the heating velocity v as the control parameter in accordance with the heating procedure determined in the above description. Next, the linear heating is executed sequentially by using the heating lines 21y and 22y in the y-direction. Then, the heating velocity $v_x$ related to the heating lines 2x in the x-direction has been confirmed to exist in the database in Step S5, the heating velocity $v_x$ being for realizing the bending deformation in the direction of the maximum bending principal strain (y-direction) of the target shape of the curved surface. Therefore, the bending deformation conforming to the requirement is executed without fail.

Meanwhile, in Step S8, with regard to both the membrane strains required to execute the deflection of the target shape of the curved surface and the bending deformation in the direction of the minimum bending principal strain (x-direction), the presence of the heating velocities $v_1$ and $v_2$ related to the heating lines 21y and 22y in the y-direction is assured at the step of resetting the widths W of the calculation grids 1 in the x-direction, the heating velocities $v_1$ and $v_2$ being for realizing the above deflection. The heating lines 21y and 22y are sequentially heated at the heating velocities $v_1$ and $v_2$, respectively. Therefore, the membrane strains giving the above-described target shape of the curved surface and the bending deformation in the minimum bending principal strain are executed so as to conform the required membrane strains and the required bending deformation, respectively.

Hence, all of the maximum and minimum bending principal strains and the membrane strains in the two principal axis directions can be realized accurately. Therefore, the bending work can be executed with high precision. Also, even if the target shape of the curved surface is an asymmetric shape twisted to a large extent, the bending work can be executed precisely. It is necessary to combine bending principal strains in the two principal axis directions accurately in order to give a bending component generating the twist. Further, it is required to give the membrane strains around the approximate center of the steel plate accurately in order to deform a plane plate to the curved surface including a large twist. As described above, according to the heating procedure set by the method of the second preferred embodiment, the maximum and minimum bending principal strains and the membrane strains in the two principal axis directions can be realized precisely. Therefore, the heating procedure of the present invention becomes an effective heating procedure in the manufacture of a steel plate having a complicated and delicately changing asymmetric shape including a large twist on the curved surface of an outer plate, such as an outer vessel plate in recent container vessel.

(Third Preferred Embodiment)

Figure 10:
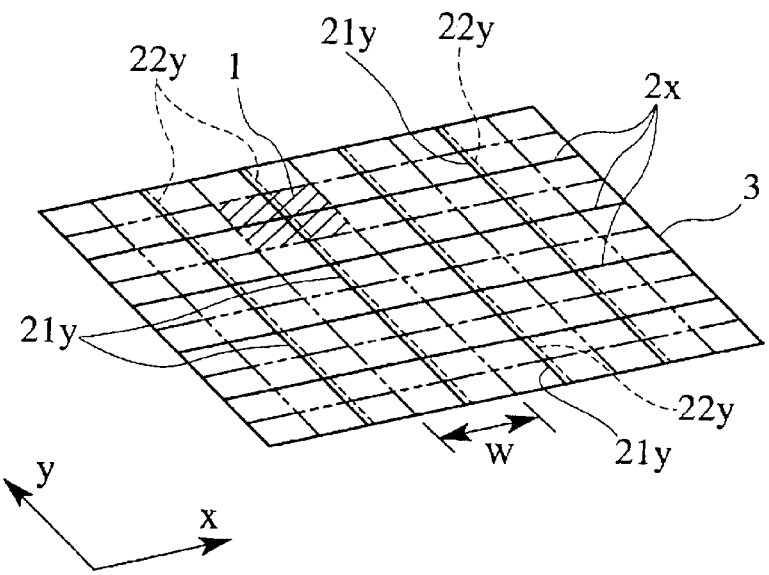
FIG. 10 is a view showing heating lines set in a third preferred embodiment of the present invention.

FIG. 10 shows a third preferred embodiment of the present invention. The third preferred embodiment is a method similar to the second preferred embodiment described with reference to FIGS. 4 to 9B. However, the third preferred embodiment is different from the second preferred embodiment in the following point. In the second preferred embodiment, on the surface of the steel plate 3 as a material, the sets are arranged, each having two heating lines 21y and 22y arranged parallel at a specified interval (refer to FIG. 6). However, in the third preferred embodiment, the heating lines 21y and 22y, a pair of which constitutes one set, are arranged on the front and back surfaces of the steel plate 3 one by one, respectively, so as to be located parallel at a specified interval in the horizontal direction. FIG. 10 shows a state where the heating lines 21y are arranged on the front surface and the heating lines 22y are arranged on the back surface.

Figure 11:
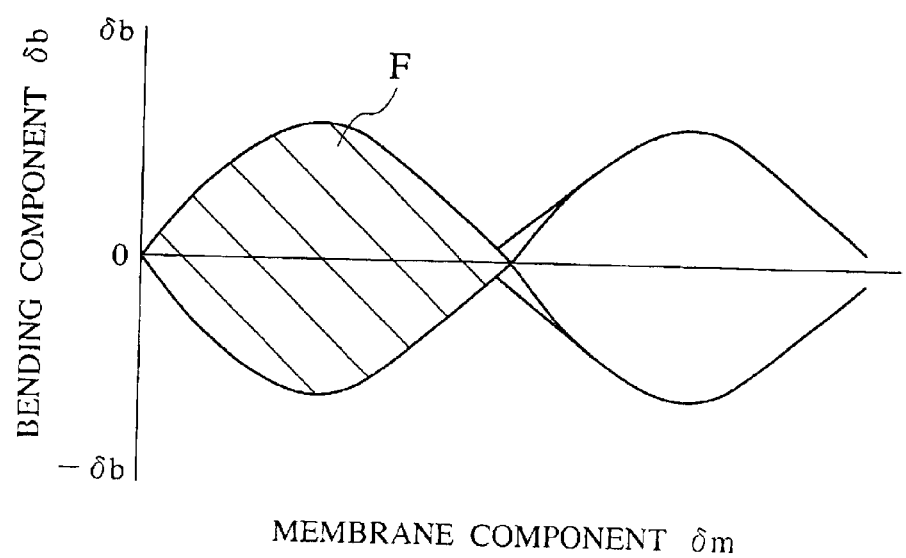
FIG. 11 is a graph showing distributions of deformation components obtained when deformations by two heating lines arranged with reference to FIG. 10 are added together.

In this case, when the heating lines 22y arranged on the back surface of the steel plate 3 are heated, the deformation brought by the heating generates a membrane component ($\delta$m) and a bending component ($-\delta$b). The bending component ($-\delta$b) acts toward a direction of canceling a bending component ($\delta$b). The bending component ($\delta$b) is generated by the heating of the heating lines 21y arranged on the front surface of the steel plate 3. Thus, as shown by the hatching in FIG. 11, the distribution of deformations is represented as a region F, the distribution being obtained when the deformations by the heating lines 21y and 22y are added together. The region F is wholly filled with the bending components while sandwiching the portion where the bending components become zero. Other steps of the method are executed similarly to steps shown in FIG. 4.

In the third preferred embodiment, first, the steel plate 3 is disposed such that the front surface of the steel plate 3 faces upward. In this state, the heating lines 2x in the x-direction are heated at a specified heating velocity $v_x$, and a bending deformation for realizing the maximum bending principal strain is given. Thereafter, the heating lines 21y are heated at a specified heating velocity $v_1$. Subsequently, the steel plate 3 is inverted upside down. The heating lines 22y arranged on the back surface are heated at a specified heating velocity $v_2$. Similarly to the second preferred embodiment described with reference to FIGS. 4 to 9B, all of the maximum and minimum bending principal strains and the membrane strains in the two principal axis direction can be realized precisely. Therefore, the bending work can be executed with high precision. Also, as apparent from the region F shown in FIG. 11, where the bending components are distributed, the bending components enabling to be realized by adding the deformations by the two heating lines 21y and 22y together, the third preferred embodiment can be made effective in the case where the membrane deformation is large and the bending deformation is small in the deformations required in the direction of the minimum bending principal strain (x-direction). Further, the region F is wholly filled with the bending components while sandwiching the portion where the bending components become zero. Accordingly, from a macroscopic viewpoint (i.e., when the shape of the curved surface is seen as an averagely deflected shape, the averagely deflected shape including a plurality of heating lines and having a dimension), any bending deformation can be realized no matter how small the deformation may be.

Figure 12:
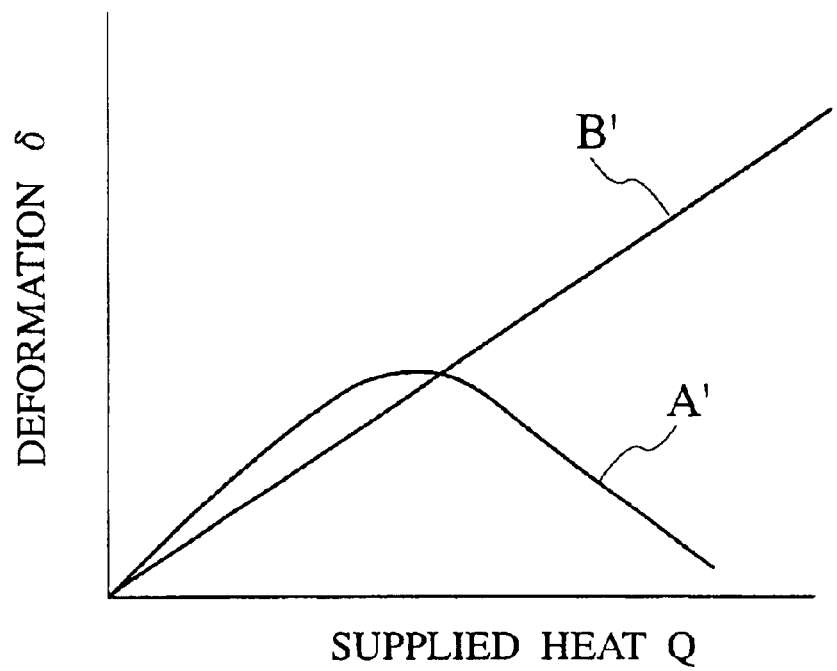
FIG. 12 is a conceptual graph showing another example of the database for use in Step S3 of FIGS. 1 and 4.

Note that the present invention is not limited only to the above-described preferred embodiments. In Step S1 of FIGS. 1 and 4, the step has been shown, in which the distribution of the main strains in the target shape of the curved surface is obtained by the elastic FEM calculation. However, by use of a relationship represented as: (bending principal strain)=(principal curvature)×(plate thickness×½), the principal curvature is obtained from the shape data of the curved surface by a geometric method. The principal curvature thus obtained is converted into the bending strain. Hence, it is also possible to obtain the distribution of the principal strains in the target shape of the curved surface. In the preferred embodiments, description has been made that the heating velocity v is used as the control parameter that determines the heating condition for any of the heating lines 2x, 2y, 21y and 22y. In the preferred embodiments, as the database in Step S3 of FIGS. 1 and 4, the database as shown in FIG. 3 is used, which stores the actual measurement values of the heating velocities v and the deformation amounts $\delta$ due to the linear heating. However, instead of this database, a database may be used, which includes both the line A' showing a relationship between the supplied heat Q and the bending deformation bb and the line B' showing a relationship between the supplied heat Q and the membrane-shrinkage deformation $\delta$m, based on actual measurement values of the supplied heat Q and the deformation amount $\delta$ due to the linear heating, as shown in FIG. 12. Namely, the supplied heat Q may be employed as the control parameter (i.e., heating condition). Also in this case, a relationship between the bending component $\delta$b and the membrane component $\delta$m in the deformation generated by the heating of one heating line becomes the same relationship as that shown by the line D in FIG. 5. Moreover, when both of the heating lines 21y and 22y, a pair of which constitutes one set, are arranged on the front surface of the steel plate 3, the range, where the deformation components that can be executed by the sum of the deformations are distributed, becomes the same as the region E shown in FIG. 8. Consequently, the second preferred embodiment described with reference to FIGS. 4 to 9B can be executed without any problem. In the meanwhile, when the heating lines 21y and 22y, a pair of which constitutes one set, are arranged on the front and back surfaces of the steel plate 3 one by one, respectively, the range, where the deformation components that can be executed by the sum of the deformations are distributed, becomes the same as the region F shown in FIG. 11. As a result, the third preferred embodiment described with reference to FIGS. 10 and 11 can also be executed without any problem. In the first preferred embodiment described with reference to FIG. 1, when the linear heating on the steel plate is executed based on the calculated heating procedure, the following method may be employed: the steel plate is simultaneously heated on both the front surface and the back surface. If two control parameters are introduced for one heating line, then both the maximum bending principal strain required for realizing the target shape of the curved surface and the membrane strains in the two principal axis directions can be realized completely. Further, it is also possible to conform even the minimum bending principal strain to the required strain. The target shape of the curved surface is not limited to the saucer shape shown in FIG. 2A, and the heating procedure of the present invention can be applied to the curved surface having every shape, for which the execution of the bending work is desired. In the second preferred embodiment described with reference to FIGS. 4 to 9B and the third preferred embodiment described with reference to FIGS. 10 and 11, when the heating lines 21y and 22y are set as sets, each of the sets having a pair, if an odd heating line without a partner heating line to be combined with is left, then a set may be made to include three heating lines. In this case, the control parameter becomes the heating velocities v of the three heating lines. When the degrees of freedom are too large for the two variables, the two variables being the bending components δb and the membrane component δm in the target deformation, the same values of the membrane strains are selected in a region. With regard to the bending deformation having a high locality, the region is divided into two sections, and the bending strains are selected so as to satisfy the integration values of the bending deformation in each the divided section. Then, the heating procedure of the present invention can be adapted to a more delicate curved surface. Furthermore, the heating sequence of the heating lines 21y and 22y can be selected arbitrarily. In addition, in accordance with the target shape of the curved surface, both the region where both of the heating lines 21y and 22y constituting one set are arranged on the same surface of the steel plate 3 and the region where these two heating lines are arranged separately on the front and back surfaces may exist mixedly on one steel plate 3. It is a matter of course that various alterations within the scope without departing from the gist of the present invention can be added besides the above.

As described above, according to the method for calculating a heating procedure of a linear heating of the present invention, excellent effects to be described below are exerted.

(1) A method for calculating a heating procedure of a linear heating, the method including: determining a distribution of bending principal strains for giving a target shape of a curved surface; dividing calculation grids along directions of the bending principal strains; dividing the directions of the bending principal strains into both a direction of a maximum bending principal strain and a direction of a minimum bending principal strain for each of the calculation grids; determining a heating condition for heating a plurality of heating lines perpendicular to the direction of the maximum bending principal strain, the heating condition defying the maximum bending principal strain; obtaining membrane strains generated accompanying with heating the plurality of heating lines under the heating condition from a database, the database including a relation between the heating condition and deformation components; calculating a distribution of membrane strains required for achieving a deflection of the target shape of the curved surface in consideration of a distribution of the membrane strains obtained from the database; selecting a heating condition satisfying both the maximum bending principal strain and the calculated distribution of the membrane strains; and determining a heating procedure under the selected heating condition. In this connection, the following effects are brought about.

(a) The heating conditions of the linear heating are controlled by one control parameter. Accordingly, even if the minimum bending principal strain is ignored, the bending work can be executed with high precision sufficient for practical use.

(b) The bending strain and the membrane strains, which are included in the deformation (the discrete strain) obtained by the actual heating of the heating lines, are referred to as a database. Therefore, the relationship between the bending strain and the membrane strains is determined, which are generated accompanying with the heating of the heating lines arranged perpendicularly to each other, and thus the number of variables of the "compatibility equation" can be decreased to solve the simultaneous equations. Further, it can be assured that the constitution of the strain components selected resultantly by solving these equations is a constitution that can be realized by the actual heating.

(c) At the step of obtaining a continuous target specific strain, the target specific strain is obtained as such a strain that can be realized under the existing heating condition. Consequently, the calculated heating procedure can be made as an efficient heating procedure, which generates a curved surface with a little residual stress.

(d) At the step of obtaining a target specific strain, the optimum strain distribution is obtained. As a result, the load of an optimization calculation can be reduced, and the time for convergence calculation can be shortened.

(2) A method for calculating a heating procedure of a linear heating, the method including: determining a distribution of bending principal strains for giving a target shape of a curved surface; dividing calculation grids along directions of the bending principal strains; dividing the directions of the bending principal strains into both a direction of a maximum bending principal strain and a direction of a minimum bending principal strain for each of the calculation grids; determining a heating condition for heating a plurality of heating lines perpendicular to the direction of the maximum bending principal strain, the heating condition defying the maximum bending principal strain; obtaining membrane strains generated accompanying with heating the plurality of heating lines under the heating condition from a database, the database including a relation between the heating condition and deformation components; calculating a distribution of membrane strains required for achieving a deflection of the target shape of the curved surface in consideration of a distribution of the membrane strains obtained from the database; setting the plurality of heating lines along the direction of the maximum bending principal strain as one set, the plurality of heating lines being perpendicular to the direction of the minimum bending principal strain, and the one set of the plurality of heating lines being arranged parallel one another at a specified interval; obtaining a heating condition for each of the plurality of heating lines such that a sum of the deformation components generated by heating each of the plurality of heating lines allows to give the minimum bending principal strain and the calculated distribution of membrane strains required for achieving a deflection of the target shape of the curved surface; and determining a heating procedure satisfying the maximum principal strain, the minimum bending principal strain and the membrane strains under the obtained heating condition.

In such a manner, the linear heating is executed in accordance with the obtained heating procedure, and thus all of the maximum and minimum bending principal strains and the membrane strains in the two principal axis directions can be realized accurately. Furthermore, the bending work can be executed with high precision. Consequently, even if the curved surface is twisted largely and asymmetric, in which the bending principal strains in the two principal axis directions are required to be combined accurately with each other, and the membrane shrinkage is required to be given accurately around the approximate center of the steel plate, the bending work can be executed therefor precisely.

(3) When a plurality of heating lines perpendicular to the direction of the minimum bending principal strain are set as the one set and disposed parallel at the specified interval, each the one set of the heating lines is arranged separately on front and back surfaces of a steel plate as a material.

In such a manner, the bending components of the deformations obtained by the heating of one set of the heating lines are canceled with each other, and the sum of the bending components is reduced. Therefore, the heating procedure can be made effective when the membrane shrinkage is large and the bending deformation is small in the required deformation. Moreover, any bending deformation can be realized no matter how small the deformation may be.

(4) When a plurality of heating lines perpendicular to the direction of the minimum bending principal strain are set as the one set and disposed parallel at the specified interval, a width of each of the calculation grids along the direction of the minimum bending principal strain is set, and an absolute amount of the sum of the deformation components generated by heating each of the one set of the heating lines equals a required deformation amount different for each of the calculation grids located along the direction of the maximum bending principal strain.

In such a manner, the heating lines, a plurality of which constitutes a set, can be arranged continuously.

(5) A heating velocity is adopted as the heating condition, and the database is configured by storing actual measurement values showing relations between the heating velocity and the deformation components.

In such a manner, as the control parameter, the heating velocity can be employed, which is generally used as a control parameter when executing the linear heating.

(6) A supplied heat is adopted as the heating condition, and the database is configured by storing actual measurement values showing relations between the supplied heat and the deformation components.

In such a manner, as the control parameter, the supplied heat can be employed, which is generally used as a control parameter when executing the linear heating.

The present disclosure relates to subject matters contained in Japanese Patent Application No. 2001-352076, filed on Nov. 16, 2001, and Japanese Patent Application No. 2002-038329, filed on Feb. 15, 2002, the disclosure of which is expressly incorporated herein by reference in its entirety.

While the preferred embodiments of the present invention have been described using specific terms, such description is for illustrative purposes. It is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention as defined in the following claims.

What is claimed is:

1. A method for calculating a heating procedure of a linear heating, the method comprising the steps of:

determining a distribution of bending principal strains for giving a target shape of a curved surface;

dividing calculation grids along directions of the bending principal strains;

dividing the directions of the bending principal strains into both a direction of a maximum bending principal strain and a direction of a minimum bending principal strain for each of the calculation grids;

determining a heating condition for heating a plurality of heating lines perpendicular to the direction of the maximum bending principal strain, the heating condition defying the maximum bending principal strain;

obtaining membrane strains generated accompanying with heating the plurality of heating lines under the heating condition from a database, the database including a relation between the heating condition and deformation components;

calculating a distribution of membrane strains required for achieving a deflection of the target shape of the curved surface in consideration of a distribution of the membrane strains obtained from the database;

selecting a heating condition satisfying both the maximum bending principal strain and the calculated distribution of the membrane strains; and determining a heating procedure under the selected heating condition.

2. The method according to claim 1, wherein a heating velocity is adopted as the heating condition, and the database is configured by storing actual measurement values showing relations between the heating velocity and the deformation components.

3. The method according to claim 1, wherein a supplied heat is adopted as the heating condition, and the database is configured by storing actual measurement values showing relations between the supplied heat and the deformation components.

4. A method for calculating a heating procedure of a linear heating, the method comprising the steps of:

determining a distribution of bending principal strains for giving a target shape of a curved surface;

dividing calculation grids along directions of the bending principal strains;

dividing the directions of the bending principal strains into both a direction of a maximum bending principal strain and a direction of a minimum bending principal strain for each of the calculation grids;

determining a heating condition for heating a plurality of heating lines perpendicular to the direction of the maximum bending principal strain, the heating condition defying the maximum bending principal strain;

obtaining membrane strains generated accompanying with heating the plurality of heating lines under the heating condition from a database, the database including a relation between the heating condition and deformation components;

calculating a distribution of membrane strains required for achieving a deflection of the target shape of the curved surface in consideration of a distribution of the membrane strains obtained from the database;

setting the plurality of heating lines along the direction of the maximum bending principal strain as one set, the plurality of heating lines being perpendicular to the direction of the minimum bending principal strain, and the one set of the plurality of heating lines being arranged parallel one another at a specified interval;

obtaining a heating condition for each of the plurality of heating lines such that a sum of the deformation components generated by heating each of the plurality of heating lines allows to give the minimum bending principal strain and the calculated distribution of membrane strains required for achieving a deflection of the target shape of the curved surface; and determining a heating procedure satisfying the maximum bending principal strain, the minimum bending principal strain and the membrane strains under the obtained heating condition.

5. The method according to claim 4, wherein, when the plurality of heating lines perpendicular to the direction of the minimum bending principal strain are set as the one set and disposed parallel at the specified interval, each the one set of the heating lines is arranged separately on front and back surfaces of a steel plate as a material.

6. The method according to claim 4, wherein, when the plurality of heating lines perpendicular to the direction of the minimum bending principal strain are set as the one set and disposed parallel at the specified interval, a width of each of the calculation grids along the direction of the minimum bending principal strain is set, and an absolute amount of the sum of the deformation components generated by heating each of the one set of the heating lines equals a required deformation amount different for each of the calculation grids located along the direction of the maximum bending principal strain.

7. The method according to claim 4, wherein a heating velocity is adopted as the heating condition, and the database is configured by storing actual measurement values showing relations between the heating velocity and the deformation components.

8. The method according to claim 4, wherein a supplied heat is adopted as the heating condition, and the database is configured by storing actual measurement values showing relations between the supplied heat and the deformation components.

* * * * *